United States Patent
Hurley et al.

[11] Patent Number: 6,020,061
[45] Date of Patent: Feb. 1, 2000

[54] EMULSION POLYMERIZATION USING POLYMERIC SURFACTANTS

[75] Inventors: Steven M. Hurley, Racine; Frederick C. Hansen, Union Grove, both of Wis.

[73] Assignee: S. C. Johnson Commercial Markets, Inc., Sturtevant, Wis.

[21] Appl. No.: 08/842,696

[22] Filed: Apr. 15, 1997

[51] Int. Cl.⁷ .................................................. B32B 7/12
[52] U.S. Cl. ........................ 428/336; 524/457; 524/458; 524/460; 524/804; 528/392
[58] Field of Search .................... 428/336; 528/392; 524/457, 460, 458, 804

[56] References Cited

U.S. PATENT DOCUMENTS

| | | | |
|---|---|---|---|
| 2,313,565 | 3/1943 | McDowell et al. | 528/196 |
| 2,694,087 | 11/1954 | Petrie et al. | 528/196 |
| 2,912,416 | 11/1959 | Newey | 528/196 |
| 3,029,250 | 4/1962 | Gaertner | 528/196 |
| 3,255,108 | 6/1966 | Wiese | 528/196 |
| 3,269,946 | 8/1966 | Wiese | 528/196 |
| 3,488,311 | 1/1970 | Burdick et al. | 528/196 |
| 3,553,117 | 1/1971 | Gutweiler | 528/196 |
| 3,560,455 | 2/1971 | Hazen et al. | 528/196 |
| 3,560,456 | 2/1971 | Hazen et al. | 528/196 |
| 3,560,457 | 2/1971 | Hazen et al. | 528/196 |
| 3,630,902 | 12/1971 | Coupland | 252/515 A |
| 3,649,543 | 3/1972 | Cahn et al. | 252/526 |
| 3,793,226 | 2/1974 | Danzik | 252/526 |
| 3,801,549 | 4/1974 | Moore et al. | 260/780 A |
| 3,840,499 | 10/1974 | DiGiolio | 260/78.5 T |
| 3,880,811 | 4/1975 | Kaupp | 260/780 A |
| 4,036,803 | 7/1977 | Kobashi et al. | 260/29.6 AN |
| 4,163,645 | 8/1979 | Cheng et al. | 44/62 |
| 4,169,924 | 10/1979 | Barabas et al. | 525/377 |
| 4,180,637 | 12/1979 | Evani et al. | 526/204 |
| 4,185,485 | 1/1980 | Schick et al. | 72/42 |
| 4,252,852 | 2/1981 | Goth | 428/336 |
| 4,284,517 | 8/1981 | Chen et al. | 252/8.55 D |
| 4,317,893 | 3/1982 | Chen et al. | 525/328 |
| 4,358,573 | 11/1982 | Verbrugge | 526/272 |
| 4,434,260 | 2/1984 | Beck et al. | 524/104 |
| 4,469,839 | 9/1984 | Marohashi et al. | 524/458 |
| 4,481,319 | 11/1984 | Sackmann et al. | 524/213 |
| 4,522,992 | 6/1985 | Verbrugge | 526/272 |
| 4,564,371 | 1/1986 | Ueda et al. | 44/51 |
| 4,588,786 | 5/1986 | Kadono et al. | 525/327.6 |
| 4,598,118 | 7/1986 | Hansen et al. | 524/517 |
| 4,618,450 | 10/1986 | Higgins | 252/355 |
| 4,623,683 | 11/1986 | Villarreal et al. | 524/47 |
| 4,623,692 | 11/1986 | Hansen | 524/549 |
| 4,675,359 | 6/1987 | Kadono et al. | 524/832 |
| 4,680,202 | 7/1987 | Coyle et al. | 427/389.9 |
| 4,709,091 | 11/1987 | Fukumoto et al. | 562/595 |
| 4,730,019 | 3/1988 | Hansen | 524/549 |
| 4,770,803 | 9/1988 | Forsberg | 252/75 |
| 4,772,671 | 9/1988 | Steeman et al. | 526/216 |
| 4,774,081 | 9/1988 | Flashinski et al. | 424/78 |
| 4,774,082 | 9/1988 | Flashinski et al. | 424/78 |
| 4,775,723 | 10/1988 | Kohne et al. | 525/327.7 |
| 4,780,499 | 10/1988 | Villarreal et al. | 524/549 |
| 4,786,681 | 11/1988 | Baker et al. | 524/710 |
| 4,816,524 | 3/1989 | Anzai et al. | 525/378 |
| 4,820,762 | 4/1989 | Tsaur | 524/460 |
| 4,849,489 | 7/1989 | Benhamou et al. | 526/208 |
| 4,855,350 | 8/1989 | Coyle et al. | 524/506 |
| 4,859,752 | 8/1989 | Bosanec et al. | 526/209 |
| 4,871,823 | 10/1989 | Billman et al. | 526/272 |

(List continued on next page.)

FOREIGN PATENT DOCUMENTS

| | | |
|---|---|---|
| 51-001706 | 8/1976 | Japan . |
| 83013679 | 1/1983 | Japan . |
| 6088052 | 3/1994 | Japan . |
| 6172728 | 6/1994 | Japan . |
| 7118312 | 5/1995 | Japan . |
| 1246953 | 9/1971 | United Kingdom ............ C08F 27/00 |

*Primary Examiner*—Terressa Mosley-Boykin
*Attorney, Agent, or Firm*—Renee J. Rymarz; Warren R. Bovee

[57] ABSTRACT

An emulsion polymerization system comprising a polymeric stabilizer, wherein the polymeric stabilizer comprises one or more alpha olefin/maleic anhydride copolymers and is present in the emulsion polymerization system in an amount greater than 0 and less than 5% by weight.

35 Claims, 2 Drawing Sheets

PARTICLE SIZE VS. RESIN LEVEL 50BA/50MMA

U.S. PATENT DOCUMENTS

| | | | |
|---|---|---|---|
| 4,889,896 | 12/1989 | Canova et al. | 525/375 |
| 4,919,821 | 4/1990 | Fong et al. | 210/698 |
| 4,931,510 | 6/1990 | Sackmann et al. | 525/302 |
| 5,013,794 | 5/1991 | Sackmann et al. | 424/203 |
| 5,015,712 | 5/1991 | Newman | 525/304 |
| 5,166,272 | 11/1992 | Burks et al. | 525/285 |
| 5,205,960 | 4/1993 | Kristopeit et al. | 252/174.24 |
| 5,258,466 | 11/1993 | Sackmann et al. | 525/282 |
| 5,284,900 | 2/1994 | Izubayashi et al. | 524/492 |
| 5,298,568 | 3/1994 | Suzuki | 525/327 |
| 5,326,843 | 7/1994 | Lorah et al. | 526/318.6 |
| 5,446,105 | 8/1995 | Hombek et al. | 525/327.6 |
| 5,491,190 | 2/1996 | Sandvick et al. | 524/322 |
| 5,521,267 | 5/1996 | Giencke et al. | 526/201 |
| B1 4,358,573 | 11/1983 | Verbrugge | 526/272 |

EMULSION POLYMERIZATION USING POLYMERIC SURFACTANTS

BACKGROUND OF THE INVENTION

1. Field of the Invention

This invention relates to copolymers used as supports for emulsion polymerization. More particularly, this invention relates to alpha olefin maleic anhydride copolymers used as supports for emulsion polymerization.

2. Related Background Art

Aqueous emulsion polymerization is a process whereby water insoluble or mostly water insoluble monomers are polymerized in dispersed form in an aqueous medium. A surfactant or a surfactant blend is typically used to stabilize the prepared insoluble polymer particles, maintaining particle integrity and preventing phase separation.

Aqueous emulsion polymer systems have been developed in response to continuing environmental and regulatory pressures to reduce and/or eliminate the use of volatile organic solvents in polymer preparation and delivery systems. While emulsion polymerization has proven to be a highly successful and practical method of preparing commercial industrial polymer products, the performance characteristics of such systems, such as in coatings applications, often do not match the performance obtained from a polymer system delivered from an organic solvent. This is due in part to the existence of the surfactant in the emulsion polymer system. Comprised mostly of highly charged molecules, for example ionic type surfactants such as sodium lauryl sulfate, the surfactant contributes adversely to properties such as water resistance and detergent resistance in coatings applications.

Copolymerizable surfactants, fugitive surfactants, and reactive surfactants have been proposed in the patent and scientific literature as steps toward higher performing emulsion polymer systems. While these approaches have all met with some technical and commercial success, economic considerations often prevent these technologies from displacing conventional surfactants in emulsion polymerization.

An alternative technology is the use of polymeric materials as the stabilizing species in emulsion polymerization systems. These polymeric materials have been referred to in various publications as polymeric surfactants, protective colloids, polymer supports, support resins, polymer seeds, or polymeric stabilizers, and are typically lower molecular weight, between about 400–20,000 Daltons. The polymeric materials' functionality yields a polymer that is either water soluble or soluble on addition of base (known as alkali soluble resin, which contains carboxylic acid or sulfonic acid), or upon addition of acid (known as acid soluble resin, which contains nitrogen). These "polymeric stabilizers", as referred to herein, serve the same purpose as conventional surfactants in emulsion polymerization, and also provide additional performance characteristics not obtainable from conventional surfactants such as gloss development, flow and leveling control, and dry time control. Polymeric stabilizers are preferably prepared using weaker acids such as carboxylic acids instead of sulfonic acids, and utilize a fugitive amine, for example triethyl amine or ammonia, which results ultimately in a noncharged stabilizing component in the film. As explained below, the presence of large amounts of ionic species in final polymers can detract from performance characteristics such as water resistance. Systems containing polymeric stabilizers exhibit improved resistance properties including water resistance when compared to conventional stabilizers.

Examples of emulsion polymerization systems exist in the patent literature, whereby variations in the monomers, surfactants, addition profiles and processing conditions result in unique compositions and/or unique performance characteristics. U.S. Pat. Nos. 4,931,510, 5,013,794 and 5,258,466 disclose diisobutylene/maleic anhydride copolymers modified to imide with aminosulfonic acid which are used as resin supports in ranges of 2.5–30% by weight. The resins are used to polymerize such monomers as styrenics, (meth)acrylates, (meth)acrylonitriles and mixtures thereof. The resulting polymers are disclosed as useful as paper surface and fiber sizing agents.

U.S. Pat. No. 5,166,272 discloses an alpha olefin ($C_8$, $C_{10}$, $C_{12}$) or undecylenic acid/maleic anhydride copolymer which has been modified to incorporate some olefin functionality used in an amount between 5% and 30% by weight to polymerize (meth)acrylics useful in coatings.

U.S. Pat. No. 4,775,723 discloses an alpha olefin ($C_6$–$C_{40}$)/maleic anhydride copolymer, partially esterified, used in an amount of 2.5% to polymerize ethyl acrylate useful as a lubricant and emulsifying agent.

Japanese Patent No. 6,172,728 discloses an isobutylene/maleic anhydride copolymer modified to imide (commercial Japanese product Isobam 304™) used in an amount of 13.8% by weight to polymerize vinyl acetate monomers which are used in adhesives. The patent discloses use of a co-stabilizer of modified polyvinyl alcohol. U.S. Pat. No. 5,298,568 discloses an alpha olefin/maleic anhydride copolymer modified with hydroxy and amino used in an amount of 81% by weight to polymerize acrylate monomers useful in inks and adhesives.

Japanese Patent No. 7,118,312 discloses a chlorinated alpha olefin/maleic anhydride copolymer used in an amount of 50% by weight to polymerize methacrylates useful as a pigment dispersion and in inks. Japanese Patent Nos. 51 001,706, and 83 013,679 disclose a nonpolymeric adduct of alpha olefin/maleic anhydride extended with diamine used in an amount of 20–80% by weight to polymerize (meth)acrylates and (meth)acrylonitriles which are useful as paper sizing agents. Although appearing similar, these adducts are actually non-polymeric emulsifiers and not properly characterized as polymeric stabilizers. Finally, Japanese Patent No. 6,088,052 discloses a diisobutylene/maleic anhydride copolymer, and partial esters thereof, used in an amount of 17% to 95% by weight to polymerize (meth)acrylates useful in ink, overprint and varnishes.

Although the published prior art teaches that polymers can be used as stabilizers in emulsion polymerization systems at levels as low as 5% by weight, experience has shown that these polymeric stabilizers are typically useful only at the level of 20 to 30 percent.

While the use of polymeric stabilizers generally enhances polymer performance, this relatively high level of stabilizer traditionally used often introduces some undesirable attributes for certain applications, including wet adhesion and long term water resistance.

Therefore an emulsion polymerization stabilizer is desirable which eliminates the need for volatile organic solvents in polymer preparation and delivery systems and is active at reduced levels from those of typical conventional and polymeric stabilizers.

SUMMARY OF THE INVENTION

This invention provides an emulsion polymerization system comprising a polymeric stabilizer, wherein the polymeric stabilizer comprises one or more alpha olefin/maleic anhydride copolymers and is present in the emulsion polymerization system in an amount greater than 0 and less than 5% by weight.

The copolymer compositions used in the emulsion polymerization system of the invention can be used to prepare stable emulsion polymers at levels of polymeric stabilizer previously believed unattainable by those familiar with polymer stabilized emulsion polymerization. The polymeric stabilizers of this invention provide the benefits realized from prior emulsion polymeric stabilizers. However, because they are used in reduced amounts, and in some instances in amounts less than conventional stabilizers, they avoid the drawbacks of prior art conventional and polymeric stabilizers. In addition, they provide advantageous performance and property attributes. For example, polymers resulting from the claimed emulsion polymerization system exhibit improved properties due to reduced particle size.

This invention also provides a process for producing a polymer by emulsion polymerization which comprises combining in an aqueous solution at least one monomer, a free radical initiator and a polymeric stabilizer comprising one or more alpha olefin/maleic anhydride copolymers, wherein the polymeric stabilizer is present in the aqueous solution in an amount greater than 0 and less than 5% by weight.

DETAILED DESCRIPTION OF THE INVENTION

Figure 1:
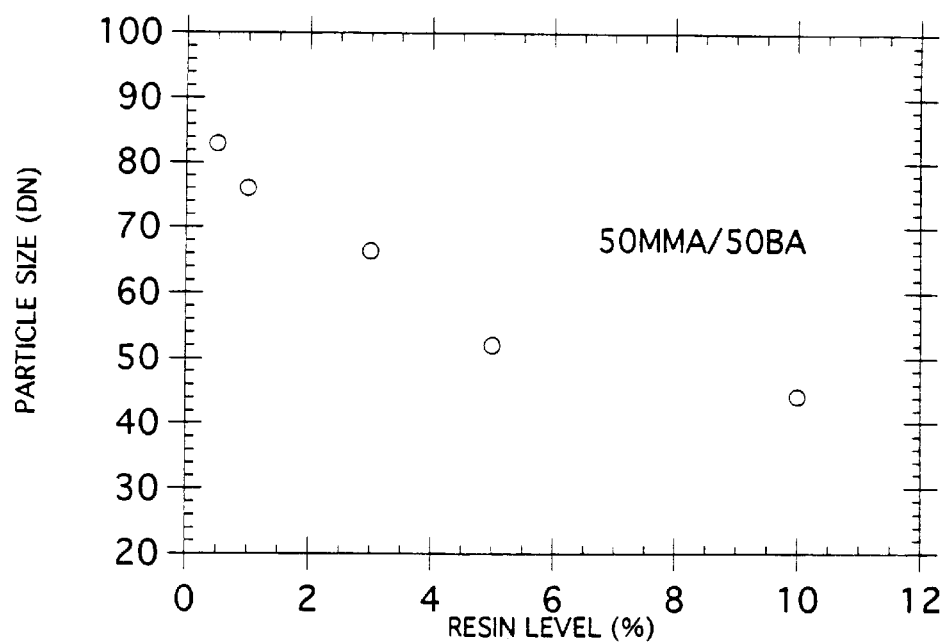
FIG. 1 shows the particle size to polymeric stabilizer concentration relationships for an emulsion polymerization system comprising 50% butyl acrylate monomer, 50% methyl methacrylate monomer and the polymer stabilizer of the present invention.

The present invention provides an emulsion polymerization system comprising a polymeric stabilizer which comprises one or more copolymers of alpha olefin and maleic anhydride. The term "emulsion polymerization system" as used herein refers to a combination of monomers in aqueous solution, from which a desired end product polymer precipitates to a stable dispersion. This system can include further components as discussed hereinafter.

This invention provides for the use of greatly reduced amounts of stabilizers or surfactants in typical emulsion polymerization techniques. The polymeric stabilizers are generally present in the emulsion polymerization system of the invention in as small an amount as necessary to provide emulsion stabilization. Generally, the polymer stabilizer is present in the emulsion polymer system in an amount greater than 0 and less than 5 percent by weight. In a preferred embodiment the polymer stabilizer is present in the emulsion polymer system in an amount between about 0.5 percent and 4 percent by weight. In an equally preferred embodiment the polymer stabilizer is present in the emulsion polymer system in an amount between about 0.5 percent and 2 percent by weight. In a particularly preferred embodiment the polymer stabilizer is present in an amount between about 0.5 percent and 1 percent by weight.

Copolymers of maleic anhydride and olefin are known. The olefin/maleic anhydride system is unique in its tendency to form regular alternating copolymers. The olefin/maleic anhydride alternating copolymer has the general structure:

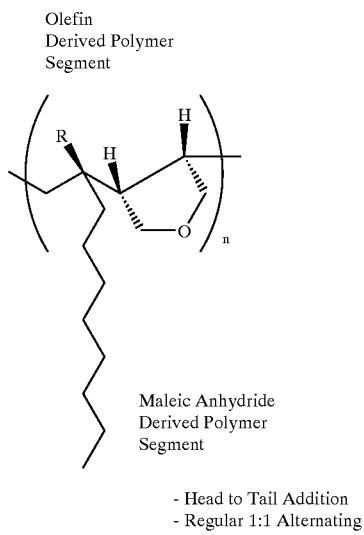

Olefin Derived Polymer Segment

Maleic Anhydride Derived Polymer Segment

- Head to Tail Addition
- Regular 1:1 Alternating

The alpha olefin maleic anhydride polymers useful in the present invention are polymers of maleic anhydride and at least one 1-alkene. Preferably, the polymers are comprised of from about 49 to 95 mole percent of maleic anhydride and from about 5 to 51 mole percent of alpha olefin. These polymers are partially disclosed in U.S. Pat. No. 4,358,573 (bulk processing) and U.S. Pat. No. 4,522,992 (solution processing) which patents are expressly incorporated by reference for their disclosure of suitable alpha olefin maleic anhydride polymers as well as in U.S. Pat. No. 4,871,823 likewise incorporated herein by reference.

The anhydride included in the alpha olefin maleic anhydride polymers is most preferably maleic anhydride. However, other maleic anhydrides can be utilized in this formation of the polymers such as methylmaleic anhydride, dimethylmaleic anhydride, fluoromaleic anhydride, methylethyl maleic anhydride and the like. Accordingly, as employed herein the term "maleic anhydride" includes such anhydrides in whole or in part. It is preferred that the anhydride be substantially free of acid and the like before polymerization.

The alpha olefins generally suitable in the formation of the polymeric stabilizers described herein have from 2 to 60 carbon atoms, preferably between about 2 and 30+ carbon atoms, and include the following: ethylene; propylene; 1-butene; 1-pentene; 1-hexene; 1-heptene; 1-octene; 1-nonene; 1-decene; 1-dodecene; 1-tetradecene; 1-hexadecene; 1-heptadecene; 1-octadecene; 2-methyl-1-butene; 3,3-dimethyl-1-pentene; 2-methyl-1-heptene; 4,4-dimethyl-1-heptene; 3,3-dimethyl-1-hexene; 4-methyl-1-pentene; 1-eicosene; 1-docosene; 1-tetracosene; 1-hexacosene; 1-octacosene; 1-triacontene; 1-tetracontene; 1-octatriacontene; 1-tetracontene; 1-octatetracontene; 1-pentacontene; 1-hexacontene; and mixtures thereof. The term "30+" or "$C_{30+}$" is used herein in its commonly accepted usage wherein a "$C_{30+}$" 1-alkene mixture is a mixture of high boiling 1-alkenes with carbon content between about 30 and 60 carbon atoms per molecule.

Mixtures of the olefins can be combined with anhydrides described above to form terpolymers or higher polymers. It is preferred to utilize straight chain 1-alkenes having from 6 to 18 carbon atoms, and accordingly, 1-hexene, 1-heptene, 1-octene, 1-nonene, 1-decene, 1-dodecene, 1-tetradecene, 1-hexadecene, 1-heptadecene, 1-octadecene, and mixtures thereof are preferred. These materials should be substantially free of diolefin as an impurity which causes gel formation and cross-linking. However, small amounts, i.e., less than 2 percent, can be present without causing undue gel formation and cross-linking in the resulting polymers. Also as noted above, either single materials, i.e., 1-hexene, 1-decene, etc., can be used, or mixtures of these materials may be utilized.

As is well known in the art, polymers containing equimolar ratios of alpha olefin to maleic anhydride are essentially alternating polymers with maleic anhydride alternating between random comonomers. Accordingly, the alpha olefin maleic anhydride polymers may contain from about 49 to 95 mole percent of maleic anhydride and more preferably, from 49 to 70 mole percent of maleic anhydride. Under some conditions such as is described in U.S. Pat. No. 4,871,823 noted above, it is possible to include an excess of maleic anhydride relative to the comonomer in these polymers. The amount of alpha olefin will correspondingly vary from about 5 to about 51 mole percent. The optimum alpha olefin maleic anhydride polymers include about 50 mole. % maleic anhydride and about 50 mole % alpha olefin, but this is dependent upon the alpha olefin selected. This is generally true for $C_{18}$ and higher carbon content alpha olefins, referred to herein as "$C_{18+}$ alpha olefins". For polymers containing between about $C_4$ and about $C_{10}$ alpha olefins, it is preferred that greater than an equimolar amount of maleic anhydride be used, up to about 50 mole percent greater.

Generally, it has been found that copolymers of maleic anhydride and a single alpha olefin having no less than 6 and no more than 24 carbon atoms are needed to obtain clear, single phase aqueous compositions, and more preferably, between 6 and 18 carbon atoms alpha olefins maleic anhydride polymers containing higher alpha olefins (i.e., more than 24 carbons per molecule) can be used in the compositions of the present invention in the form of ter- or higher polymers which also contain at least one $C_2$ to $C_{18}$ alpha olefin. Preferably, the ratio of $C_2$–$C_{18}$:$C_{18+}$ alpha olefins is such that the average alpha olefin carbon chain length in the polymer is greater than about 6 and less than about 18 to obtain clear, single phase aqueous compositions.

The alpha olefin maleic anhydride polymers may be prepared by any of a number of conventional polymerization processes including polymerization processes as set forth in U.S. Reissue Pat. No. Re. 28,475 and U.S. Pat. Nos. 3,553,117, 3,560,455, 3,560,456, 3,560,457, 3,488,311, 4,522,992, 4,358,573, 4,871,823 and 4,859,752. These patents are all incorporated herein by reference.

The polymeric stabilizers of the present invention are generally low molecular weight materials having a number average molecular weight of from about 500 to about 50,000. In a preferred embodiment the polymeric stabilizers have a weight average molecular weight of from about 3,000 to about 50,000.

The emulsion polymerization system of the present invention is useful for preparing polymers according to known emulsion polymerization techniques. In a typical technique, emulsion polymerization involves polymerizing a mixture of ethylenically unsaturated copolymerizable monomers in an aqueous reaction medium, in the presence of a surfactant and a free radical initiator. The aqueous reaction medium is the liquid in which the various components are dispersed in an emulsion state by the stabilizer and is substantially composed of water.

In a preferred embodiment of the present invention, the alpha olefin maleic anhydride polymer stabilizer described above is substituted for conventional surfactants. However, the emulsion polymerization system of this invention may comprise the alpha olefin maleic anhydride polymer stabilizer described above and, optionally, one or more conventional surfactants at levels up to 3 percent by weight. Examples of such surfactants include, but not limited to, linear alkyl phenol ethoxylates and primary alcohol ethoxylates such as Triton and Tergitol, respectively (Union Carbide, Danbury, Conn.).

The free radical initiators useful in the emulsion polymerization system of this invention can be a thermal initiator or a redox initiator. Examples of suitable free radical initiators and components thereof include persulfate initiators, such as sodium persulfate, potassium persulfate, barium persulfate, and ammonium persulfate; alkali metal bisulfites; peroxides such as benzoyl peroxide, and dicumyl peroxide; hydroperoxides such as methyl hydroperoxide and ter-butyl hydroperoxide; acyloins such as benzoin; peracetates such as methyl peracetate and tert-butyl peracetate; perbenzoates such as t-butylperbenzoate; peroxalates such as dimethyl peroxalate and di(tert-buty) peroxalate; and azo compounds such as azo-bis-isobutyronitrile and dimethyl azo-bis-isobutyrate. Mixtures of such free radical initiators may also be employed. Typically, the free radical initiator is employed in an amount of at least about 0.1%, preferably from about 0.3% to about 1.0% by weight based on the total weight of the monomers present and depending on the weight and activity of the initiator.

Suitable monomers that can be polymerized using the emulsion polymerization system of the present invention include monoethylenically unsaturated monomers such as ethylenically unsaturated aromatic monomers, acrylic acid ester monomers, methacrylic acid ester monomers, ethylenically unsaturated acid functional group-containing monomers, and ethylenically unsaturated hydroxy functional group-containing monomers. Diethylenically unsaturated monomers may also be used if restricted to levels low enough to avoid gelling the polymer.

Examples of ethyleneically unsaturated aromatic monomers include styrene, alpha-methyl styrene, vinyl toluene, para-methylstyrene, and tertbutyl styrene. Examples of acrylic acid ester monomers are those containing from 1 to 20 carbon atoms in the alkyl group which include methyl acrylate, ethyl acrylate, n-propyl acrylate, isopropyl acrylate, n-butyl acrylate, n-decyl acrylate, isopropyl acrylate, n-butyl acrylate, n-decyl acrylate, and 2-ethylhexyl acrylate. Examples of methacrylic acid ester monomers are those containing from 1 to 20 carbon atoms in the alkyl group which include methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, allyl methacrylate, sec-butyl methacrylate, tert-butyl methacrylate, 2-ethylbutyl methacrylate, cinnamyl methacrylate, crotyl methacrylate, cyclohexyl methacrylate, cyclopentyl methacrylate, methallyl methacrylate, n-octyl methacrylate, and 2-ethylhexyl methacrylate. Examples of methacrylates containing aromatic groups include 2-phenylethyl methacrylate and phenyl methacrylate.

Examples of acid functional group-containing ethylenically unsaturated monomers include acrylic acid, methacrylic acid, crotonic acid, itaconic acid, fumaric acid, maleic acid, citraconic acid, and monoalkyl esters of unsaturated dicarboxylic acids. Examples of hydroxy functional group-containing ethylenically unsaturated monomers include 2-hydroxyethyl acrylate, 2-hydroxybutyl acrylate, 6-hydroxyhexyl acrylate, 2-hydroxypropyl methacrylate, 6-hydroxyhexyl methacrylate, and 5,6-dihydroxyhexyl methacrylate. Of these, hydroxyethyl-, hydroxypropyl- and hydroxybutyl acrylates are preferred.

The present invention also provides a process for producing a desired polymer by emulsion polymerization which comprises combining in an aqueous solution at least one monomer, a free radical initiator and a polymeric stabilizer comprising one or more alpha olefin/maleic anhydride copolymers, wherein the polymeric stabilizer is present in the aqueous solution in an amount greater than 0 and less than 5 percent by weight of the monomers used. In a preferred embodiment the polymeric stabilizer is present in an amount between about 0.5 percent and 4 percent by weight. In another preferred embodiment the polymeric stabilizer is present in an amount between 0.5 percent and 2 percent by weight. In a further preferred embodiment the polymeric stabilizer is present in an amount between about 0.5 percent and 1 percent by weight.

The present invention provides an end product polymer having greatly reduced particle size which are produced by the emulsion polymerization process described above. The end product polymers produced by the methods of this invention have a particle size less than about 100 nanometers. In a preferred embodiment the end product polymers have a particle size between about 40 and about 90 nanometers. In comparison, typical emulsion polymerization end product polymers have particle sizes in the range of greater than 100 to about 300 nanometers. Due to their small particle size and low levels of stabilizer, end product polymers produced by the emulsion polymerization system of this invention are particularly useful for glossy finishes, ink binders, overprint varnishes, industrial coatings and the like.

As discussed above, the ability to reduce the level of polymeric surfactant in the emulsion polymer system yields enhancements in performance of surface coating prepared from these emulsion polymers. In addition, the emulsion polymers prepared according to the present invention allows for more flexibility in formulating emulsion polymer systems. For example, typical polymeric stabilized emulsion polymerization systems may contain 30% polymeric resin. Because prior art polymeric support resins are used in amounts approaching 30%, no flexibility is provided in such systems for the addition of other resins to provide other performance characteristics to the finished polymer. In the present invention, however, the lower levels of polymeric stabilizer provide for greater flexibility in formulation. For example, a 1% resin can be used to prepare the emulsion polymer and the additional 29% made up of additional resins post blended in to provide additional performance characteristics. This greatly expands the number of useful compositions that can be prepared using polymeric stabilizer systems.

The polymeric stabilizers of the present invention are typically added as an aqueous solution of polymer and a neutralizing substance. As discussed above, conventional surfactants are comprised of highly charged molecules, for example ionic type surfactants such as sodium lauryl sulfate. A polymer stabilizer or surfactant, on the other hand, must be neutralized in a solution which provides a counter ion to allow the polymer to mix with the aqueous emulsion. The "neutralizing agent" can be organic or inorganic provided that it allows for salvation of the polymer stabilizer in the aqueous emulsion system.

Examples of organic neutralizing agents include, but are not limited to, volatile organic substances such as ammonia or amines, preferably tri-, di-, or monoalkylamines, for example triethyl amine, morpholine, or alkanolamines, such as 2-amino-1-methyl propanol. The volatile organic substance will perform the neutralizing function and then evaporate upon the formation of the end product polymer. Examples of inorganic neutralizing substances include, but are not limited to, aqueous alkaline solutions containing sodium, potassium, and lithium. Since the inorganic substance is typically not volatile, the counter ion used to perform the neutralizing function will remain in the end product polymer. The prior art shows that the presence of the counter ion detracts from end product polymer performance such as water resistance. However, the present invention, since it uses greatly reduced amounts of polymer stabilizer, allows for the use of inorganic neutralizing agents which result in levels of counter ion which does not detract from the performance of the polymer end product.

In one embodiment of the emulsion polymerization system, the polymer support is present in a sodium-neutralized solution. In a preferred embodiment of the emulsion polymerization system, the polymer support is present in an ammonium-neutralized solution.

In the present invention, emulsion polymerization can be carried out by any well known free radical addition aqueous emulsion polymerization process, including batch, semi-batch, multiple stage batch, multiple stage semi-batch, and continuous emulsion polymerization. Preferably, the polymerization according to the present invention is conducted by semi-batch polymerization. Semi-batch polymerization generally involves initially charging into a polymerization reactor a reaction medium such as water and additional components which facilitate the preparation of a stable dispersion of the polymer in the reaction medium. These components include the surfactants and the bases discussed above. Other ingredients known in the art such as seed latices for particle size regulation, monomer precharge for in-situ seed latex preparation, polymer initiators/catalysts/accelerators, chain transfer agents such as butyl mercaptopropionate for molecular weight regulation, and chelators for incidental metal removal may also be added.

The free radical initiator is then added to the initial charge followed by controlled addition, with agitation, of the ethylenically unsaturated copolymerizable monomers over a period of from about 30 minutes to about 4 hours at a temperature ranging from about 74° C. to about 85° C. Of course, depending upon the free radical initiator employed, higher or lower temperatures and other monomer feed profiles can be employed. When a redox initiator is employed as the free radical initiator, the monomers and the initiator may be simultaneously fed to the initial charge. When the initiator is soluble and suitably stable in the monomers, it can be added to the monomer mixture and thus added to the initial charge along with the monomers. Those of ordinary skill in the art recognize that various initiators exist which operate at various temperatures, including room temperature, and selection of the appropriate initiator will depend upon the methods employed. Upon completion of the controlled monomer addition, the formed polymer is continuously stirred and maintained at a temperature to facilitate complete consumption of the monomers. Thereafter the polymer is cooled, and additional components such as additional surfactants and bases may be added to further ensure dispersion stabilization. Other well known ingredients including defoamers, wetting agents, thickeners, preservatives, UV stabilizers, and water may also be added, as needed. An inert gas such as nitrogen is typically used to purge the polymerization reactor of oxygen and is usually continued throughout the polymerization process.

INDUSTRIAL APPLICABILITY

The emulsion polymerization systems of the invention provide for the use of greatly reduced levels of the surfactant typically use which results in benefits in performance properties of the resulting polymer, in manufacturing capacity, and in meeting progressive governmental regulatory restrictions with respect to storage, handling and disposal of VOC's. The end use applications of the emulsion polymers of this invention include coating applications such as glossy finishes, ink binders, overprint varnishes, wood lacquers, maintenance and industrial coatings and the like.

The following Examples are provided to illustrate the invention only. They are not intended, and should not be interpreted, to limit the invention defined in claims which follow thereafter.

EXAMPLE 1

Aqueous Ammonia Solution of 20% C10/80% C18 Aloha Olefin Maleic Anhydride Copolymer A glass 5 liter 4 necked round bottomed flask equipped with a condenser, thermometer with thermoregulator (Thermowatch®, Instruments for Research and Industry, Cheltenham, Pa.), mechanical agitation and heating mantle was charged with a maleic anhydride alpha olefin copolymer (800 grams; Mw=16000 by size exclusion chromatography) consisting of a 20/80 mole ratio of alpha olefins 1-decene ($C_{10}$) and 1-octadecene ($C_{18}$) and deionized water (2992 grams). A 28% solution of aqueous ammonia was added (208 grams) with agitation, and the temperature was brought to 75° C. Agitation was continued until homogeneous, resulting in a clear, yellowish, slightly viscous solution of pH: 8.34; % solids: 17.44%; and viscosity: 19 centipoise (0.019 pascal·seconds, "pa·s")

EXAMPLE 2

Aqueous Sodium Solution of 20% C10/80% C18 Aloha Olefin Maleic Anhydride Copolymer A glass 5 liter 4 necked round bottomed flask equipped with a condenser, thermometer with thermoregulator (Thermowatch®), mechanical agitation and heating mantle was charged with a maleic anhydride alpha olefin copolymer (229 grams; Mw=16000 by size exclusion chromatography) consisting of a 20/80 mole ratio of alpha olefins 1-decene ($C_{10}$) and 1-octadecene ($C_{18}$) and deionized water (931 grams). Sodium hydroxide pellets (39.3 grams; EM Science, Gibbstown, N.J.), 97% minimum assay) were added with agitation, and the temperature was brought to 85° C. Agitation was continued until homogeneous, approximately 6 hours. The resulting aqueous solution was clear, slightly yellow with pH: 9.18; % solids: 19.46%; and viscosity: 10.5 centipoise (0.0105 pa·s).

EXAMPLE 3

High Efficiency of Support Resin—20% C10/80% C18 Alpha Olefin Maleic Anhydride Copolymer, 50% n-Butyl Acrylate/50% Methyl Methacrylate Emulsion Polymer A. Polymer stabilizer.

A 19.0% solids aqueous ammonia solution of an alpha olefin/maleic anhydride terpolymer was prepared using techniques outlined in Examples 1 and 2 above, using a copolymer comprised of 50 mole percent maleic anhydride and 50 mole percent of a 20/80 mole ratio of 1-decene ($C_{10}$) and 1-octadecene ($C_{18}$). The olefin maleic anhydride terpolymer was determined to have a weight average molecular weight of 16000 (Mw size exclusion chromatography vs. polystyrene standards) and contain as residuals 8 percent by weight 1-octadecene and 1 percent by weight 1-decene. This polymer stabilizer solution was used to prepare a series of emulsion polymers (A through F in Tables 1 and 2) with varying levels of polymer stabilizer contained therein.

B. Emulsion Polymer.

A glass 2 liter 4 necked round bottomed flask equipped with mechanical agitation, thermometer with thermoregulator (Thermowatch®), condenser, nitrogen purge line, mechanical feed pump, and heating mantle, was charged with deionized water and the above resin solution and raised to 82 degrees Celsius. A 16% solution of ammonium persulfate initiator in deionized water was added to the reactor, and a 50 n-butyl acrylate/50 methyl methacrylate monomer mixture was fed into the reactor over a 60 minute time period. Nitrogen was used as an inert gas purge throughout the reaction, and the temperature was maintained at 82 degrees Celsius. The monomer addition period was followed by a one hour hold period, whereupon the reaction was cooled, and filtered through 100 micron screening to a storage container.

Table 1 shows the various levels of emulsion polymerization reactants A through F used to prepare this series of copolymers. G is a control emulsion with no polymer stabilizer. Table 2 outlines some of the physical properties of the resulting polymers.

TABLE 1

50% BA/50% MMA Particle Size versus Resin Level

| | EMULSION | A | B | C | D | E | F | G |
|---|---|---|---|---|---|---|---|---|
| | % STABILIZER | 10 | 6 | 3 | 2 | 1 | 0.5 | 0 |
| CHARGE: | Deionized Water (g) | 646 | 708 | 766.5 | 766.5 | 766.5 | 766.5 | 766.5 |
| | Resin Solution (19%) (g) | 192.5 | 120 | 56.6 | 37.3 | 18.65 | 9.4 | 0 |
| INITIATOR CHARGE: | Ammonium Persulfate (g) | 2.65 | 2.68 | 2.8 | 2.8 | 2.8 | 2.8 | 2.8 |
| | Deionized Water (g) | 13.6 | 17 | 15 | 15 | 15 | 15 | 15 |

TABLE 1-continued

50% BA/50% MMA Particle Size versus Resin Level

| | EMULSION | A | B | C | D | E | F | G |
|---|---|---|---|---|---|---|---|---|
| FEED: | n-Butyl Acrylate (g) | 164.6 | 168 | 174 | 174 | 174 | 174 | 174 |
| | Methyl Methacrylate (g) | 164.6 | 168 | 174 | 174 | 174 | 174 | 174 |
| FLUSH: | Deionized Water (g) | 12 | 12 | 12 | 12 | 12 | 12 | 12 |

TABLE 2

50% BA/50% MMA Particle Size versus Resin Level

| EMULSION | A | B | C | D | E | F | G |
|---|---|---|---|---|---|---|---|
| % STABILIZER | 10 | 6 | 3 | 2 | 1 | 0.5 | 0 |
| % SOLIDS | 30.6 | 29.9 | 30.2 | 30.1 | 30.7 | 30.1 | 30.5 |
| pH (19%) | 7.9 | 7.7 | 7.3 | 6 | 5.5 | 4.76 | 1.74 |
| VISCOSITY: | | | | | | | |
| centipoise | 14.00 | 10.00 | 10.00 | 6.80 | 5.00 | 7.00 | 4.00 |
| (pa · s) | (0.014) | (0.010) | (0.010) | (0.0068) | (0.005) | (0.007) | (0.004) |
| PARTICLE SIZE (diameter in nm) | 44 | 52 | 66 | 67 | 76 | 83 | 517 |
| APPEARANCE | a | a | a | a | a | a | b | a Translucent, no settlement
b Milky settlement

As illustrated, all of the alpha olefin/maleic anhydride copolymer stabilized emulsion polymers were free of coagulum and were translucent in appearance. The particle size measurements (instruments used: CHDF, (capillary hydrodynamic fractionation vs. polystyrene particle size standards) reveal that the alpha olefin/maleic anhydride copolymers yielded emulsion polymers with small particle size. In contrast, in the absence of support resin the resulting emulsion polymer (emulsion G) was milky, separated on storage, and was extremely large in particle size.

EXAMPLE 4

Comparative Example—Standard Styrene Acrylic Copolymer Polymeric Stabilizer

As a comparison, a standard styrene acrylic copolymer described in U.S. Pat. No. 4,820,762 was used at reduced levels. A glass 2 liter 4 necked round bottom flask equipped with mechanical agitation, thermometer with thermoregulator (Thermowatch®), condenser, nitrogen purge line, mechanical feed pump, and heating mantle was charged with deionized water and a 29.5% solids resin solution of a commercial styrene acrylic copolymer (Joncryl 678®; S. C. Johnson, Racine, Wis.) and raised to 82 degrees Celsius. A 16% solution of ammonium persulfate initiator in deionized water was added to the reactor, and a 50 n-butyl acrylate/50 methyl methacrylate monomer mixture was fed into the reactor over a 60 minute time period. Nitrogen was used as an inert gas purge throughout the reaction, and the temperature was maintained at 82 degrees Celsius. The monomer addition period was followed by a one hour hold period, whereupon the reaction was cooled, and filtered through 100 micron screening to a storage container.

For polymerizations containing 5% and 10% resin, the polymerization was observed to proceed poorly, with a very milky appearance with some flocculation. Filtration through 100 micron screening was slow and the decanted samples exhibited gross separation on standing. Table 3 summarizes the reaction components for the styrene acrylic copolymer support comparative examples. Table 4 summarizes the appearance of these preparations.

TABLE 3

Data for Comparative Examples:
50% BA/50% MMA Using Styrene Acrylic Support Resin

| | | COMPARATIVE A | COMPARATIVE B |
|---|---|---|---|
| | | % STABILIZER | |
| | | 10 | 5 |
| CHARGE: | Deionized Water (g) | 714 | 750.7 |
| | Resin Solution (29.5%) (g) | 124 | 77.3 |
| INITIATOR CHARGE: | Ammonium persulfate (g) | 2.65 | 2.68 |
| | Deionized Water (g) | 13.6 | 17 |
| FEED: | n-Butyl Acrylate (g) | 164.6 | 168 |
| | Methyl Methacrylate (g) | 164.6 | 168 |
| FLUSH: | Deionized Water (g) | 12 | 12 |

TABLE 4

Results for Comparative Examples:
50% MA/50% MMA Using Styrene Acrylic Support Resin

|  | COMPARATIVE A | COMPARATIVE B |
|---|---|---|
|  | % STABILIZER | |
|  | 10 | 5 |
| Appearance: | Milky; Thin; Much separation on standing Unsuccessful Synthesis | Milky; Thin; Much separation on standing Unsuccessful Synthesis |

Tables 1, 2, 3, and 4 demonstrate the utility of the alpha olefin/maleic anhydride copolymers of the subject invention to prepare small particle size emulsion polymers using low levels of polymer stabilizer. Comparisons to standard styrene acrylic polymer show that the use of such levels of styrene acrylic polymeric stabilizer yield unacceptable emulsion polymers. In addition, the absence of any alpha olefin/maleic anhydride copolymer (Table 1) also yields unacceptable emulsion polymer preparation.

EXAMPLE 5

Figure 2:
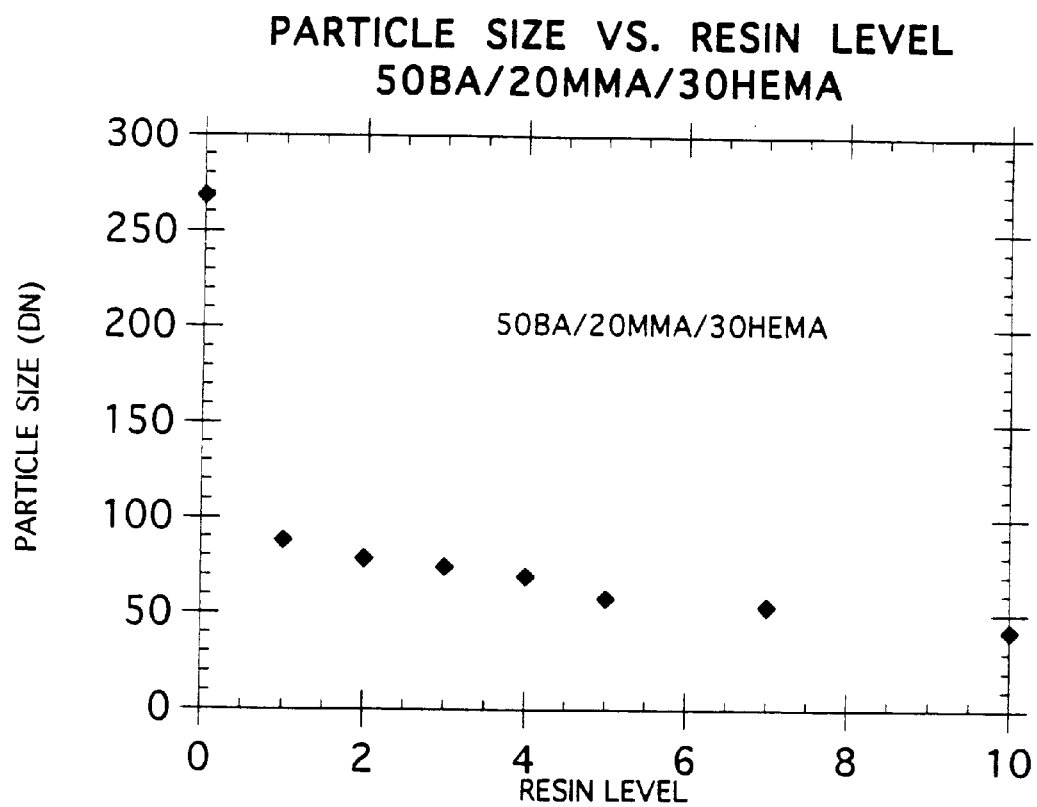
FIG. 2 shows the particle size to polymeric stabilizer concentration relationships for an emulsion polymerization system comprising 50% n-butyl acrylate monomer, 20% methyl methacrylate monomer, 30% 2-hydroxyethyl methacrylate monomer and the polymer stabilizer of the present invention.

High Efficiency of Polymeric Stabilizer 20% C10/ 80% C18 Alpha Olefin-Maleic Anhydride Terpolymer Another series of emulsion polymers were prepared in a similar manner to the first series (Example 1), using instead a 50% n-Butyl Acrylate/20% Methyl Methacrylate/30% 2-Hydroxyethyl Methacrylate ("50BA/20MMA/30HEMA") emulsion polymer composition. As in the first series, one observes that small particle size emulsion polymers are obtained even when the polymeric stabilizer is used at the level of 1 percent. With no alpha olefin/maleic anhydride copolymer a stable emulsion polymer was obtained, but had a large particle size of 268 nm. Stability of the emulsion polymer containing no polymeric stabilizer is presumed to be due to the stabilizing effect of the hydroxyl function monomer, 2-hydroxyethyl methacrylate. Table 5 summarizes the particle size data from the various levels of resin. FIGS. 1 and 2 are graphical representations of the particle size data found in Table 2 and Table 5.

TABLE 5

50 BA/20 MMA/30 HEMA Particle Size versus Resin Level

| EMULSION | A | B | C | D | E | F | G |
|---|---|---|---|---|---|---|---|
| % STABILIZER | 15 | 10 | 7 | 4 | 2 | 1 | 0 |
| PARTICLE SIZE: (Diameter, CHDF) | 35 | 41 | 54 | 69 | 78 | 88 | 268 |
| APPEARANCE: | a | a | a | a | a | a | b | a Translucent, no settlement
b Milky settlement

EXAMPLE 6

Ammonia Free Clear Coating (Overprint Varnish)

There is a desire to eliminate or reduce the level of ammonia present in state of the art inks and overprint varnishes. A reduction in the resin level in the emulsion polymerization allows one to use sodium hydroxide instead of ammonia as the neutralizing species. Even though sodium counter-ion is a permanent component of the film (whereas ammonia volatizes out of the film), the low sodium levels do not compromise performance.

An ammonia free emulsion polymer was prepared containing as a stabilizing species a sodium hydroxide neutralized alpha olefin maleic anhydride copolymer ($C_{10}/C_{18}$ 20/80), the level of which was 6% as follows: a 19.0% solids aqueous sodium hydroxide solution of an alpha olefin/maleic anhydride terpolymer was prepared as described above, using a copolymer comprised of 50 mole percent maleic anhydride and 50 mole percent of a 20/80 mole ratio of 1-decene ($C_{10}$) and 1-octadecene ($C_{18}$). The olefin maleic anhydride terpolymer was determined to have a weight average molecular weight of 16000 (Mw, size exclusion chromatography vs. polystyrene standards), and containing as residuals 8 percent by weight 1-octadecene and 1 percent by weight 1-decene. This resin solution was used as a polymeric stabilizer in the subsequent emulsion polymerization.

A glass 2 liter 4 necked round bottomed flask equipped with mechanical agitation, thermometer with thermoregulator (Thermowatch®), condenser, nitrogen purge line, mechanical feed pump, and heating mantle was charged with deionized water (708 grams) and the above resin solution (120 grams) and raised to 82 degrees Celsius. A 16% solution of ammonium persulfate initiator (2.68 grams) in deionized water (17 grams) was added to the reactor, and mixture of n-butyl acrylate (154.5 grams), methyl methacrylate (111 grams), 2-hydroxyethyl methacrylate (67.1 grams), and SEM-25® monomer (3.4 grams) (PPG Industries, Gurnee, Ill.) was fed into the reactor over a 60 minute time period. A flush of the monomer lines with deionized water (12 grams) followed. Nitrogen was used as an inert gas purge throughout the reaction, and the temperature was maintained at 82 degrees Celsius. The monomer addition period was followed by a one hour hold period, after which the reaction was cooled, and filtered through 100 micron screening to a storage container.

The final emulsion polymer was translucent, the solids were determined to be 30.1%, the pH was 8.1 and the viscosity was 8 centipoise (0.008 pa·s). Table 6 illustrates some of the performance attributes of the emulsion polymer compared to the prior art commercial polymeric stabilized emulsion polymer Joncryl 77® (S. C. Johnson, Racine, Wis.). Table 6 shows that the performance of the ammonia free polymer is at least as good as, if not better than, the state of the art emulsion polymer that contains ammonia.

TABLE 6

Performance Comparison,
A vs. Joncryl 77 ® Clear Coating
50% BA/50% MMA Using Styrene Acrylic Support Resin

| TEST | Joncryl 77 ® | A |
|---|---|---|
| Wetting | 4 | 4 |
| Leveling | 3.5 | 3.5 |
| Holdout | 4 | 4 |
| 60 degree gloss | 43.4 | 30 |
| Water Resistance (water spot test) | | |
| 1 Minute | 3.5 | 4 |
| 5 Minute | 3 | 3.5 |
| 10 Minute | 3 | 3 |

TABLE 6-continued

Performance Comparison,
A vs. Joncryl 77 ® Clear Coating
50% BA/50% MMA Using Styrene Acrylic Support Resin

| TEST | Joncryl 77 ® | A |
|---|---|---|
| 30 Minute | 3 | 3 |
| .5% Ammonia Resistance (spot test) | 2 | |
| 1 Minute | 2 | 3 |
| 5 Minute | 2 | 3 |
| 10 Minute | 1.5 | 3 |
| 30 Minute | 1.5 | 2.5 |
| .5% Sodium Hydroxide Resistance (spot test) | | |
| 1 Minute | 1 | 3 |
| 5 Minute | 0 | 2.5 |
| 10 Minute | 0 | 2 |
| 30 Minute | 0 | 1 |

Rating 1 to 5, Score 5 is best

The performance was measured on a coating prepared on a 10 point SBS board, which was previously base coated with a water based ink. The coating was prepared with a #1 Kbar wire wound drawdown bar on a K-coater® (Testing Machines, Inc., Amityville, N.Y.) automatic drawdown apparatus.

EXAMPLE 7

Highly Resistant Clear Coating (Overprint Varnish)

It is highly desirable to obtain coatings with superior resistance to various chemical solutions, most importantly water, ammonia, detergent and alkali (sodium hydroxide). The reduction of polymeric surfactant in the system provides emulsion polymers with improved resistance properties. The following emulsion polymer was prepared according to the invention using 4% by weight of an ammonia neutralized alpha olefin maleic anhydride copolymer ($C_{10}/C_{18}$ 20/80) polymer stabilizer produced according to Example 1.

A 19.0% solids aqueous ammonia solution of an alpha olefin/maleic anhydride terpolymer was prepared as described above, using a copolymer comprised of 50 mole percent maleic anhydride and 50 mole percent of a 20/80 mole ratio of 1-decene (C10) and 1-octadecene (C18). The olefin maleic anhydride terpolymer was determined to have a weight average molecular weight of 16000 (Mw, Size exclusion chromatography, vs. polystyrene standards), and contain as residuals 8 percent by weight 1-octadecene and 1 percent by weight 1-decene. This resin solution was used as a polymeric stabilizer in the subsequent emulsion polymerization.

A glass 2 liter 4 necked round bottomed flask equipped with mechanical agitation, thermometer with thermoregulator (Thermowatch®), condenser, nitrogen purge line, mechanical feed pump, and heating mantle was charged with deionized water (565.6 grams) and the above resin solution (56.6 grams) and raised to 82 degrees Celsius. About a 16% solution of ammonium persulfate initiator (2.8 grams) in deionized water (15 grams) was added to the reactor, and a mixture of n-butyl acrylate (174 grams) and methyl methacrylate (174 grams) was fed into the reactor over a 60 minutes time period. A flush of the monomer lines with deionized water (12 grams) followed. Nitrogen was used as an inert gas purge throughout the reaction, and the temperature was maintained at 82 degrees Celsius. The monomer addition period was followed by a one hour hold period, after which the reaction was cooled, and filtered through 100 micron screening to a storage container.

The final emulsion polymer was translucent, the solids were determined to be 36.5%, the pH was 7.2 and the viscosity was 11 centipoise (0.011 pa·s). Table 7 illustrates some of the performance attributes of the emulsion polymer. The table shows that the performance of the high resistance emulsion polymer is superior to the state of the art emulsion polymer Joncryl 77®.

TABLE 7

Performance Comparison,
B vs. Joncryl 77 ® Clear Coating
50% BA/50% MMA Using Styrene Acrylic Support Resin

| TEST | Joncryl 77 ® | B |
|---|---|---|
| Wetting | 4 | 4 |
| Leveling | 3.5 | 3.5 |
| Holdout | 4 | 4 |
| 60 degree gloss | 43.4 | 29.2 |
| Water Resistance (water spot test) | | |
| 1 Minute | 3.5 | 5 |
| 5 Minute | 3 | 5 |
| 10 Minute | 3 | 5 |
| 30 Minute | 3 | 5 |
| .5% Ammonia Resistance (spot test) | | |
| 1 Minute | 2 | 5 |
| 5 Minute | 2 | 5 |
| 10 Minute | 1.5 | 5 |
| 30 Minute | 1.5 | 5 |
| .5% Sodium Hydroxide Resistance (spot test) | | |
| 1 Minute | 1 | 5 |
| 5 Minute | 0 | 5 |
| 10 Minute | 0 | 4.5 |
| 30 Minute | 0 | 4 |

Rating 1 to 5, Score 5 is best

The performance was measured on a coating prepared on a 10 point SBS board, which was previously base coated with a water based ink. The coating was prepared with a #1 Kbar wire wound drawdown bar on a K-coater® automatic drawdown apparatus.

The reduction of the amount of support resin in an emulsion polymerization system while maintaining small particle size, yields polymers whose coating properties are superior to state of the art emulsion polymer coatings. In addition, the invention offers unique coating opportunities as illustrated in the novel ammonia-free emulsion polymer.

Other variations and modifications of this invention will be obvious to those skilled in this art. This invention is not to be limited except as set forth in the following claims.

What is claimed is:

1. An aqueous emulsion addition polymer system comprising a polymeric stabilizer, wherein the polymeric stabilizer comprises one or more alpha olefin/maleic anhydride copolymers and is present in the emulsion polymerization system in an amount greater than 0 and less than 5% by weight.

2. The emulsion polymerization system of claim 1 wherein the polymer stabilizer is comprised of from about 49 to 95 mole percent of maleic anhydride and from about 5 to 51 mole percent of alpha olefin.

3. The emulsion polymerization system of claim 2 wherein the polymer stabilizer is comprised of from about 49 to 70 mole percent of maleic anhydride and from about 30 to about 51 mole percent of alpha olefin.

4. The emulsion polymerization system of claim 1 wherein in the maleic anhydride is chosen from the group consisting of maleic anhydride, methylmaleic anhydride, dimethylmaleic anhydride, fluoromaleic anhydride, and methylethyl maleic anhydride.

5. The emulsion polymerization system of claim 1 wherein each alpha olefin in the polymer stabilizer has from 2 to 30+ carbon atoms.

6. The emulsion polymerization system of claim 5 wherein each alpha olefin in the polymer stabilizer has from 6 to 24 carbon atoms.

7. The emulsion polymerization system of claim 6 wherein each alpha olefin in the polymer stabilizer has from 6 to 18 carbon atoms.

8. The emulsion polymerization system of claim 1 wherein each alpha olefin is chosen from the group consisting of ethylene, propylene, 1-butene, 1-pentene, 1-hexene, 1-heptene, 1-octene, 1-nonene, 1-decene, 1-dodecene, 1-tetradecene, 1-hexadecene, 1-heptadecene, 1-octadecene, 2-methyl-1-butene, 3,3-dimethyl-1-pentene, 2-methyl-1-heptene, 4,4-dimethyl-1-heptene, 3,3-dimethyl-1-hexene, 4-methyl-1-pentene, 1-eicosene, 1-docosene, 1-tetracosene, 1-hexacosene, 1-octacosene, 1-triacontene, 1-tetracontene, 1-octatriacontene, 1-tetracontene, 1-octatetracontene, 1-pentacontene, 1-hexacontene, and mixtures thereof.

9. The emulsion polymerization system of claim 1 wherein the polymer stabilizer is a ter- or higher polymer which contains at least one $C_2$ to $C_{18}$ alpha olefin and at least one $C_{18+}$ alpha olefin.

10. The emulsion polymerization system of claim 9 wherein the ratio of $C_2$–$C_8$:$C_{18+}$ alpha olefins is such that the average alpha olefin carbon chain length in the polymer is greater than about 6 and less than about 18.

11. The emulsion polymerization system of claim 1 wherein the polymeric stabilizer has a weight average molecular weight from about 3000 to about 50,000.

12. The emulsion polymerization system of claim 11 wherein the polymeric stabilizer has a weight average molecular weight from about 5000 to about 50,000.

13. The emulsion polymerization system of claim 1 further comprising one or more surfactants.

14. The emulsion polymerization system of claim 1 further comprising one or more free radical initiators.

15. A process for producing a polymer by emulsion polymerization which comprises combining in an aqueous medium at least one monomer, a free radical initiator and a polymeric stabilizer comprising one or more alpha olefin/maleic anhydride copolymers, wherein the polymeric stabilizer is present in the aqueous solution in an amount greater than 0 and less than 5% by weight.

16. The process of claim 15 wherein the polymeric stabilizer is comprised of from about 49 to 95 mole percent of maleic anhydride and from about 5 to 51 mole percent of alpha olefin.

17. The process of claim 16 wherein the polymeric stabilizers are comprised of from about 49 to 70 mole percent of maleic anhydride and from about 30 to about 51 mole percent of alpha olefin.

18. The process of claim 15 wherein in the maleic anhydride is chosen from the group consisting of maleic anhydride, methylmaleic anhydride, dimethylmaleic anhydride, fluoromaleic anhydride, and methylethyl maleic anhydride.

19. The process of claim 15 wherein each alpha olefin in the polymer stabilizer has from 2 to 60 carbon atoms.

20. The process of claim 19 wherein each alpha olefin in the polymer stabilizer has from 6 to 24 carbon atoms.

21. The process of claim 20 wherein each alpha olefin in the polymer stabilizer has from 6 to 18 carbon atoms.

22. The process of claim 15 wherein each alpha olefin is chosen from the group consisting of ethylene, propylene, 1-butene, 1-pentene, 1-hexene, 1-heptene, 1-octene, 1-nonene, 1-decene, 1-dodecene, 1-tetradecene, 1-hexadecene, 1-heptadecene, 1-octadecene, 2-methyl-1-butene, 3,3-dimethyl-1-pentene, 2-methyl-1-heptene, 4,4-dimethyl-1-heptene, 3,3-dimethyl-1-hexene, 4-methyl-1-pentene, 1-eicosene, 1-docosene, 1-tetracosene, 1-hexacosene, 1-octacosene, 1-triacontene, 1-tetracontene, 1-octatriacontene, 1-tetracontene, 1-octatetracontene, 1-pentacontene, 1-hexacontene, and mixtures thereof.

23. The process of claim 15 wherein the polymer stabilizer is a ter- or higher polymer which contains at least one $C_2$ to $C_{18}$ alpha olefin and at least one $C_{18+}$ alpha olefin.

24. The process of claim 23 wherein the ratio of $C_2$–$C_{18}$:$C_{18+}$ alpha olefins is such that the average alpha olefin carbon chain length in the polymer stabilizer is greater than about 6 and less than about 18.

25. The process of claim 15 wherein the polymeric stabilizer has a weight average molecular weight from about 3000 to about 50,000.

26. The process of claim 25 wherein the polymer stabilizer has a weight average molecular weight from about 5000 to about 50,000.

27. The process of claim 15 further comprising the addition of one or more conventional surfactants.

28. A polymer produced by the method of claim 15 having a particle size less than about 100 nanometers.

29. The polymer of claim 28 having a particle size between about 40 and about 90 nanometers.

30. An emulsion polymerization system comprising an amine-neutralized polymeric stabilizer solution, wherein the polymeric stabilizer comprises one or more alpha olefin/maleic anhydride copolymers and is present in the emulsion polymerization system in an amount greater than 0 and less than 5% by weight.

31. An emulsion polymerization system comprising an ammonia-neutralized polymeric stabilizer solution, wherein the polymeric stabilizer comprises one or more alpha olefin/maleic anhydride copolymers and is present in the emulsion polymerization system in an amount greater than 0 and less than 5% by weight.

32. The emulsion polymerization system of claim 31 wherein the organic neutralized polymeric stabilizer solution comprises a solution of one or more alpha olefin/maleic anhydride copolymers and ammonia.

33. An emulsion polymerization system comprising an alkali-neutralized polymeric stabilizer solution, wherein the polymeric stabilizer comprises one or more alpha olefin/maleic anhydride copolymers and is present in the emulsion polymerization system in an amount greater than 0 and less than 5% by weight.

34. The emulsion polymerization system of claim 33 wherein the inorganic neutralized polymer stabilizer solution comprises a solution of one or more alpha olefin/maleic anhydride copolymers and an aqueous alkaline solution chosen from the group consisting of sodium, potassium, lithium, and mixtures thereof.

35. The emulsion polymerization system of claim 34 wherein the inorganic neutralized polymer stabilizer solution comprises a solution of one or more alpha olefin/maleic anhydride copolymers and a sodium alkali solution.

* * * * *